US008398271B2

(12) United States Patent
Chan

(10) Patent No.: US 8,398,271 B2
(45) Date of Patent: Mar. 19, 2013

(54) HEAT DISSIPATING LIGHT REFLECTING DEVICE

(76) Inventor: Pak Ming Daniel Chan, Hong Kong (HK)

( * ) Notice: Subject to any disclaimer, the term of this patent is extended or adjusted under 35 U.S.C. 154(b) by 644 days.

(21) Appl. No.: 12/652,734

(22) Filed: Jan. 5, 2010

(65) Prior Publication Data

US 2011/0164422 A1 Jul. 7, 2011

(51) Int. Cl.
*B60Q 1/14* (2006.01)

(52) U.S. Cl. .......... 362/284; 362/35; 362/232; 362/277; 362/282; 362/283; 362/285; 362/286; 362/287; 362/319; 362/324; 362/418; 362/419; 362/427; 362/429

(58) Field of Classification Search .................. 362/232, 362/277, 282–287, 324, 35, 418, 419, 427, 362/429, 319, 514, 524, 536
See application file for complete search history.

(56) References Cited

U.S. PATENT DOCUMENTS 2,444,846 A * 7/1948 Potts ............................ 362/536
4,164,012 A * 8/1979 Gulliksen ..................... 362/282
5,584,574 A * 12/1996 Haddad ......................... 362/359
6,142,649 A * 11/2000 Beghelli ........................ 362/259
7,390,110 B2 * 6/2008 Katz et al. ..................... 362/382
7,819,538 B2 * 10/2010 Nobayashi et al. ............. 362/35
7,845,830 B2 * 12/2010 Chan ............................ 362/277
7,994,670 B2 * 8/2011 Ji .................................. 310/83
8,240,896 B2 * 8/2012 Abe .............................. 362/514
2003/0016524 A1 * 1/2003 Smith ............................ 362/35
2009/0091914 A1 * 4/2009 Nobayashi ...................... 362/35
2009/0251905 A1 * 10/2009 Melzner et al. ............... 362/418
2010/0008092 A1 * 1/2010 Targetti et al. ................ 362/287
2010/0061108 A1 * 3/2010 Zhang et al. .................. 362/364
2010/0315812 A1 * 12/2010 Liu .............................. 362/235

FOREIGN PATENT DOCUMENTS

CN 2677755 Y 2/2005
JP 2001341577 A 12/2001

OTHER PUBLICATIONS

First office action of Chinese Patent Application No. 201010176816.1.

* cited by examiner

*Primary Examiner* — Diane Lee
*Assistant Examiner* — Mary McManmon

(57) ABSTRACT

A LED lamp with adjustable beam direction includes a housing, a lamp base attached to one end of the housing for insertion into a lamp socket, a heatsink shaft mounted within the housing, a LED attached to one end of the heatsink shaft, a parabolic or elliptical or multi-facet reflector having a light output front opening and an asymmetric elliptical shaped rear opening, a first actuator for rotating the reflector about the LED, and a second actuator for tilting the reflector about the LED.

20 Claims, 10 Drawing Sheets

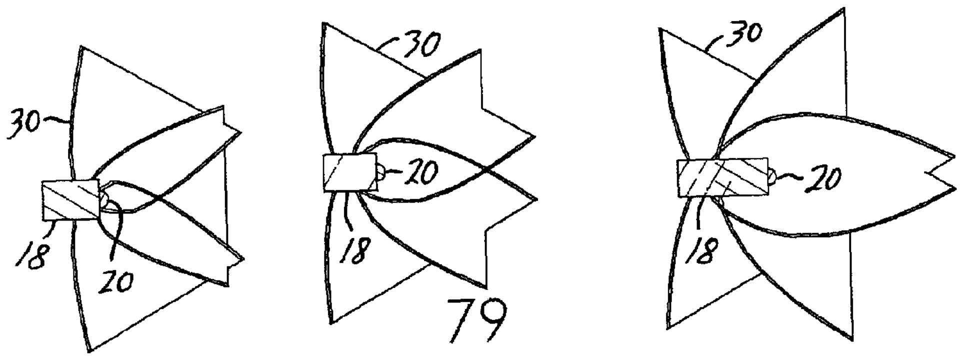
FIG. 12 (a) (b) (c)
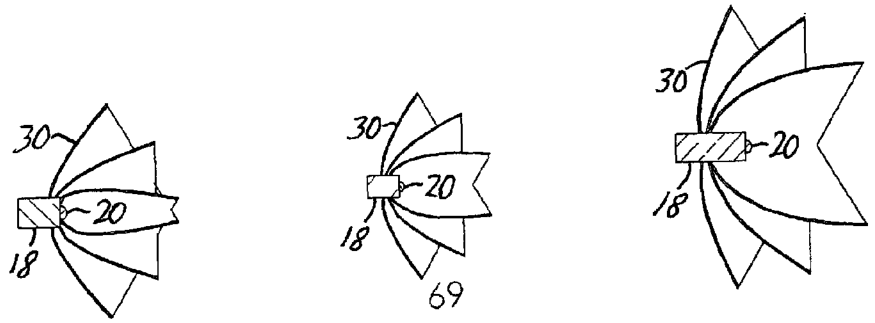
FIG. 13 (a) (b) (c)
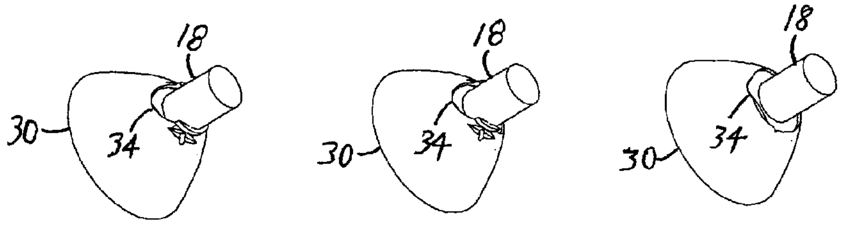
FIG. 14 (a) (b) (c)
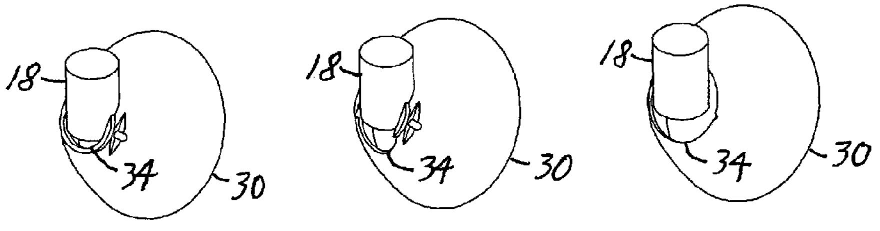
FIG. 15 (a) (b) (c)

HEAT DISSIPATING LIGHT REFLECTING DEVICE

The present patent application relates to a light reflecting device with adjustable beam direction and heat dissipating function.

BACKGROUND

Many lighting devices have the function of reflecting ones beam output to the particular direction the user desires. Many prior art devices (e.g. stage lighting devices) move the light source and reflective/refractive optics together. A common approach involves the use of a pan motor to rotate the entire tilt assembly. The drawback of this approach is bulkiness and it requires a large pan motor. Complicated slip ring design has to be added in order to achieve continuous multiple pan rotations because otherwise the wire supplying power to the tilt motor will limit the pan rotation angle. As high power LED has overtaken fluorescent lights in terms of efficacy (i.e. light flux output per unit electrical power input), it is natural to use LED light source instead of incandescent (very low efficacy) or compact fluorescent light source (contains mercury). Since size of LEDs is much smaller as compared to fluorescent lights giving same amount of light output, it is now possible to implement light reflecting function within a small space such as a light bulb. However, conventional approaches are not feasible because of the unique characteristics of high power LEDs. One characteristic of high power LED is that the heat generated during usage must be conducted away in order to keep the junction temperature below its operating limit (e.g. 125 degree Celsius), or otherwise permanent degradation or even total destruction will happen. The most common approach is by adding heatsink function to the outer casing of the LED lighting device (such as a light bulb) and keeping the thermal resistance between the LED and the heatsink as low as possible. Unlike prior arts that use other types of light sources, now there is a need for a new light reflecting mechanism such that reflecting the light output from the LED (can be an array of LEDs) does not require moving the LED at all. The reason is that it is difficult to move the LED while keeping a good heat dissipation path without moving the heatsink which is heavy in weight. Moving the bulky heatsink is often not acceptable. For example, the lamp base of a light bulb which fits into a lamp socket is the only mechanical mounting available for a light bulb. The connection between a lamp base and a lamp socket is rigid along the longitudinal direction but weak along the horizontal direction. Moving heavy mass inside the light bulb will result in swinging like a pendulum, resulting in the illuminated spot moving to and fro which is unacceptable by user.

The above description of the background is provided to aid in understanding a heat dissipating light reflecting device, but is not admitted to describe or constitute pertinent prior art to the heat dissipating light reflecting device disclosed in the present patent application, or consider any cited documents as material to the patentability of the claims of the present patent application.

SUMMARY

According to one aspect, there is provided a LED lamp with adjustable beam direction. The lamp includes:

a housing;

a lamp base attached to one end of the housing for insertion into a lamp socket;

a heatsink shaft mounted within the housing which serves as a heatsink;

a high power LED attached to one end of the heatsink shaft;

a reflector having a light output front opening and an asymmetric elliptical shaped rear opening, the LED being disposed proximate to the rear opening;

a first actuator for rotating the reflector about the LED; and a second actuator for tilting the reflector about the LED.

In one embodiment, the first actuator includes gear rotatable about the heatsink shaft, two arms having two ends fixedly connected to the gear and two opposite ends pivotably connected to a rear surface of the reflector by two pivot joints respectively, and a pan motor for rotating the gear and in turn rotating the reflector about a central longitudinal axis of the heatsink shaft.

In one embodiment, the second actuator includes:

a collar mounted around the heatsink shaft and movable along two columns connected to the housing and oriented parallel to the heatsink shaft, the collar having external threads and an inwardly and radially extending annular member;

a collar-engaging member having a proximal end attached to the reflector and a distal end slidably engaged with the annular member;

a cup gear having internal threads meshed with the external threads of the collar; and a tilt motor for rotating the cup gear, thereby driving the collar along the two columns, moving the distal end of the collar-engaging member radially relative to the annular member, and tilting the reflector about a pivot axis defined by the two pivot joints.

In one embodiment, the lamp further includes a power supply unit for converting AC power to DC power, and an electronic control for controlling the movement of the pan and tile motors.

In one embodiment, the first and second actuators are activated by a remote control.

According to another aspect, there is provided a LED light reflecting device including:

a housing;

a LED attached to the housing;

a reflector having a light output front opening and a rear opening, the reflector being rotatably and tiltably coupled to the housing with the LED disposed proximate to the rear opening;

a first actuator for rotating the reflector about the LED; and a second actuator for tilting the reflector about the LED.

In one embodiment, the LED light reflecting device further includes a heatsink shaft mounted within the housing, at least part of the housing serving as a heatsink.

In one embodiment, the first actuator comprises a gear rotatable about the heatsink shaft, two arms having two ends fixedly connected to the gear and two opposite ends pivotably connected to a rear surface of the reflector by two pivot joints, and a pan motor for rotating the gear and in turn rotating the reflector about a central longitudinal axis of the heatsink shaft.

In one embodiment, the second actuator includes:

a collar mounted around the heatsink shaft and movable along at least one column connected to the housing and oriented parallel to the heatsink shaft, the collar having external threads and an inwardly and radially extending annular member;

a collar-engaging member having a proximal end attached to the reflector and a distal end slidably engaged with the annular member;

a cup gear having internal threads meshed with the external threads of the collar; and a tilt motor for rotating the cup gear, thereby driving the collar along the at least one column, and moving the distal end of the collar-engaging member radially relative to the annular member, and tilting the reflector about a pivot axis defined by the two pivot joints.

In one embodiment, the annular member is an inwardly facing and radially extending annular groove.

In one embodiment, the collar-engaging member is a stylus comprises an enlarged head movable within the annular groove.

In one embodiment, the collar-engaging member is a pair of coaxial pins.

In one embodiment, the annular member is an inwardly facing and radially extending annular ring.

In one embodiment, the collar-engaging member is a pair of styli. The pair of styli is longitudinally spaced part and defining a space in which the annular ring slides.

In one embodiment, the rear opening is asymmetric shaped.

In one embodiment, the rear opening is defined by a parabolic half and a semi-circle half.

In one embodiment, the LED light reflecting device includes a plurality of LEDs.

In one embodiment, the LED light reflecting device further includes a plurality of sensors for sensing the pan and tilt motions of the reflector.

In one embodiment, the LED light reflecting device further includes a power supply unit for converting AC power to DC power, and an electronic control for controlling the movement of the pan and tilt motors.

In one embodiment, the two arms are spaced 180 degrees apart on the reflector.

In one embodiment, the LED light reflecting device further includes a link gear coupling between the motor and the gear rotating about the heatsink shaft.

In one embodiment, the collar is mounted around the heatsink shaft and movable along two columns connected to the housing.

In one embodiment, the LED is a high power LED.

In one embodiment, the reflector is a parabolic reflector.

In one embodiment, the reflector is an elliptical reflector.

In one embodiment, the reflector is a multi-facet reflector.

In one embodiment, the first and second actuators include:

a collar mounted around the heatsink shaft, the collar having external threads and an inwardly and radially extending annular member;

a collar-engaging member having a proximal end attached to the reflector and a distal end slidably engaged with the annular member;

a cup gear having internal threads meshed with the external threads of the collar; and a motor for rotating the cup gear thereby driving the collar along the heatsink shaft, moving the distal ends of the collar-engaging member radially relative to the annular member, and rotating and tilting the reflector simultaneously along a spiral path.

In one embodiment, the annular member is an inwardly facing and radially extending annular groove.

In one embodiment, the collar-engaging member is a stylus including an enlarged head movable within the annular groove.

In one embodiment, the collar-engaging member is a pair of coaxial pins.

In one embodiment, the annular member is an inwardly facing and radially extending annular ring.

In one embodiment, the collar-engaging member is a pair of styli. The pair of styli is longitudinally spaced part and defining a space in which the annular ring slides.

Although the heat dissipating light reflecting device disclosed in the present application is shown and described with respect to certain embodiments, it is obvious that equivalents and modifications will occur to others skilled in the art upon the reading and understanding of the specification. The present application includes all such equivalents and modifications, and is limited only by the scope of the claims.

BRIEF DESCRIPTION OF THE DRAWINGS

Specific embodiments of the heat dissipating light reflecting device disclosed in the present patent application will now be described by way of example with reference to the accompanying drawings wherein:

FIGS. 7(*a*), 8(*a*) and 9(*a*) show a pair of pins slidable within an annular groove of the collar;

FIGS. 7(*b*), 8(*b*) and 9(*b*) show a pair of styli of the reflector slidable relative to an annular ring of the collar;

FIGS. 12(*a*), 12(*b*), 12(*c*), 13(*a*), 13(*b*) and 13(*c*) show that short focal length reflectors consume less space, and require a heatsink shaft shorter in length that means lower thermal resistance;

FIGS. 14 (*a*), 14(*b*), 14(*c*), 15(*a*), 15(*b*) and 15(*c*) show that a LED light source mounted on a heatsink shaft achieve lower loss as compared to a point light source mounted on a heatsink shaft whether there is no opening at all or having an opening of either shape;

DETAILED DESCRIPTION

Reference will now be made in detail to a preferred embodiment of the heat dissipating light reflecting device disclosed in the present patent application, examples of which are also provided in the following description. Exemplary embodiments of the heat dissipating light reflecting device disclosed in the present patent application are described in detail, although it will be apparent to those skilled in the art that some features that are not particularly important to an understanding of the heat dissipating light reflecting device may not be shown for the sake of clarity.

Furthermore, it should be understood that the heat dissipating light reflecting device disclosed in the present patent application is not limited to the precise embodiments described below and that various changes and modifications thereof may be effected by one skilled in the art without departing from the spirit or scope of the appended claims. For example, elements and/or features of different illustrative embodiments may be combined with each other and/or substituted for each other within the scope of this disclosure and appended claims.

Figure 1:
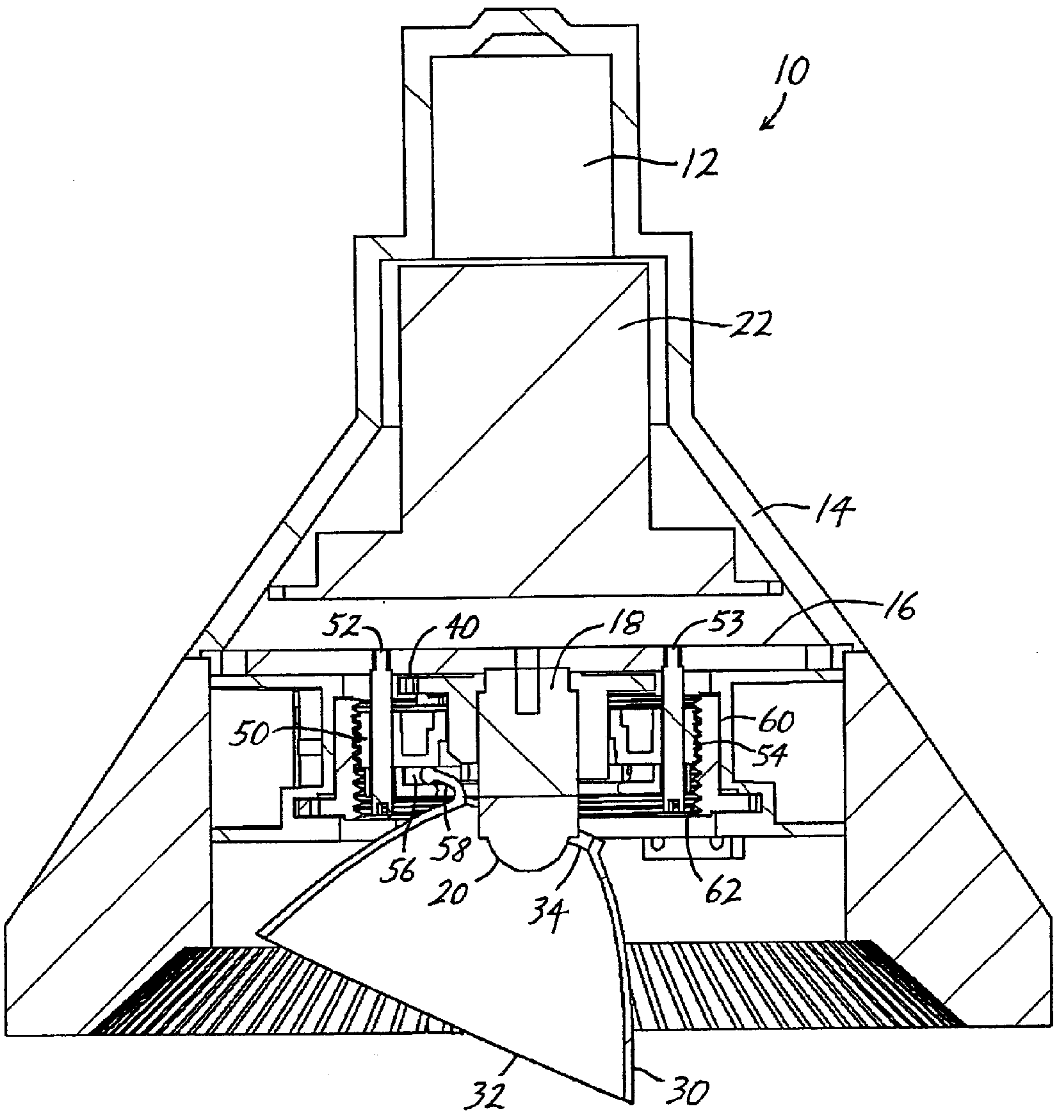
FIG. 1 is a cross sectional view of a LED lamp with a heat dissipating light reflecting device in accordance with an embodiment disclosed in the present patent application.
Figure 2:
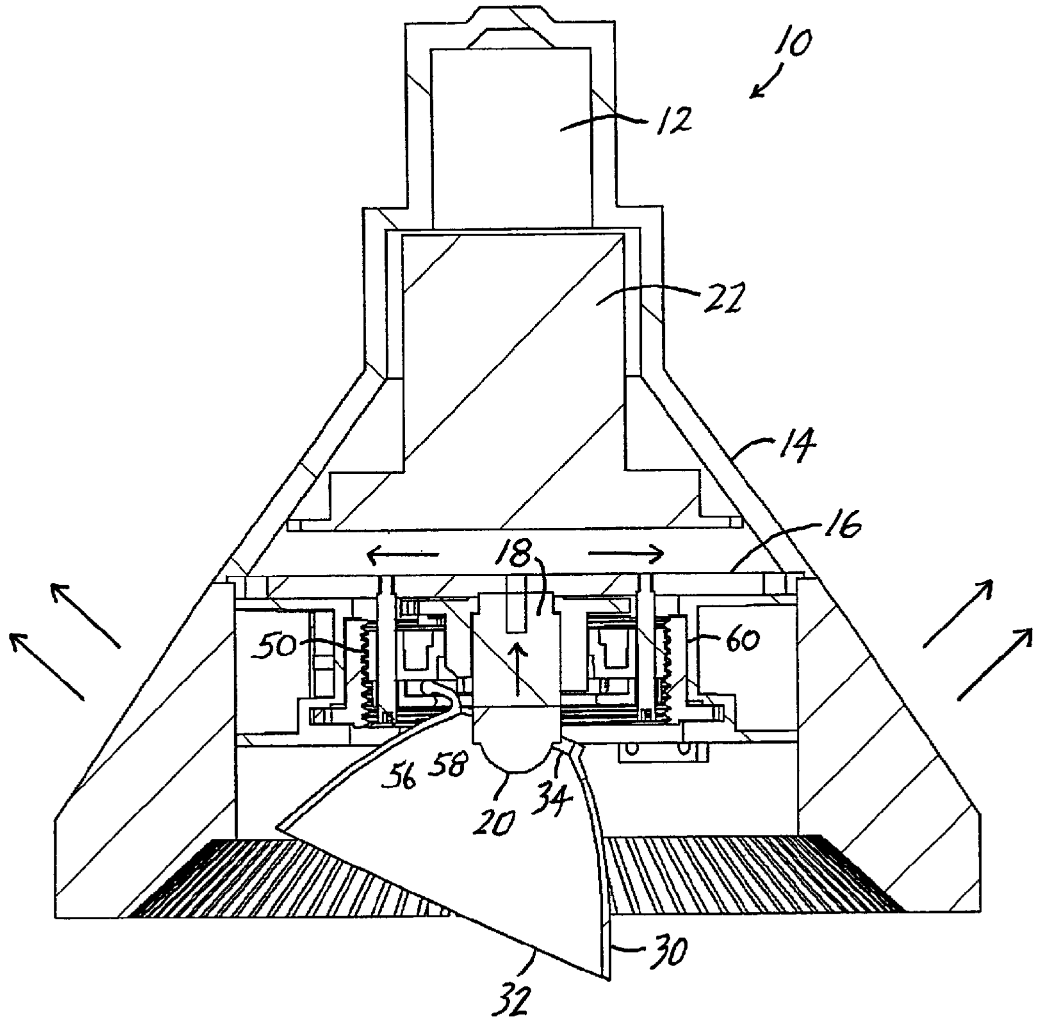
FIG. 2 shows a reliable path to conduct heat from the high power LED light source to the surrounding air.
Figure 3:
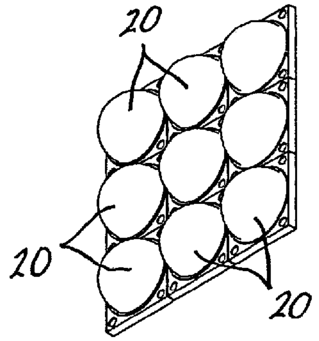
FIG. 3 is an array of high power LEDs having lower temperature difference between the junction and the LED PCB than that of a single LED giving the same amount of light output.

FIG. 1 is a cross sectional view of a light-emitting diode (LED) lamp 10 with a heat dissipating light reflecting device in accordance with an embodiment disclosed in the present patent application. The LED lamp 10 with adjustable beam direction may include a lamp base 12 that may be configured for insertion into a conventional lamp base holder or socket. The lamp base 12 is attached to a housing 14. A heatsink 16, including a heatsink shaft 18, is mounted within the housing 14 for heat dissipation. A LED 20 may be attached to one end of the heatsink shaft 18. The heat dissipating path of the LED lamp 10 is illustrated by the arrows in FIG. 2. An array of LEDs 20 may be attached to the end of the heatsink shaft 18 to produce a higher power LED light effect, as depicted in FIG. 3. The LEDs have lower temperature difference between the junction and the LED PCB than that of a single LED giving the same amount of light output.

The embodiment shown in FIG. 1 is a PAR38 sized light bulb or lamp. It draws electric power from an ordinary E26 (used in US) or E27 (used in Europe) lamp base holder or socket. Using Seoul Semiconductor's 10 watt class white LED, the lamp can deliver 700-900 lumens. Using Osram's Oslon white LED, the lamp can deliver over 2,000 lumens. Installation can be completed within seconds and an electrician is not required to perform the installation. When a user wants to change the light direction, he can send a command to the control electronics via wireless (i.e. RF or infrared) or wired (i.e. power line communication technology) link. He can command the device to illuminate at a new direction or to move to a previously stored direction. For example, in a department store, certain area is rearranged during every weekend to display certain promotion items. The directions of the conventional spot lights are required to be adjusted and re-adjusted manually by climbing up a ladder or standing on a chair twice before and after the weekend. By replacing the conventional spot lights with this PAR38 lamp and without any electrical wiring and installation work, the direction of the light beam can be re-adjusted manually (via remote control) or by commanding all PAR38 lamps in that area to change to various stored directions at the press of a button. In many homes, lighting fixtures were installed long time ago. The location of the lighting fixtures may not match the new furniture or the changing needs of the occupants. Sometimes we need certain area to be better lit up. Although some lighting fixtures can have the beam direction adjustable, such adjustments are inappropriate to be done by children or elderly people. Even ordinary people may need to stand on a chair or climb up a ladder in order to adjust the beam direction. The PAR38 lamp of the present application solves this problem and makes changing illumination conditions as easy as changing a TV channel.

The LED lamp 10 includes an elliptical or parabolic reflector 30. The reflector 30 has a light output front opening 32 and a rear opening 34. The LED 20 is disposed proximate to the rear opening 34 of the reflector 30. The rear opening 34 may be asymmetric elliptical in shape. According to the illustrated embodiment, the rear opening 34 can be formed by a semicircular half 33 and a parabolic half 35.

The lamp 10 includes a first actuator for rotating the reflector 30 about the LED 20, and a second actuator for tilting the reflector 30 about the LED 20.

Figure 4:
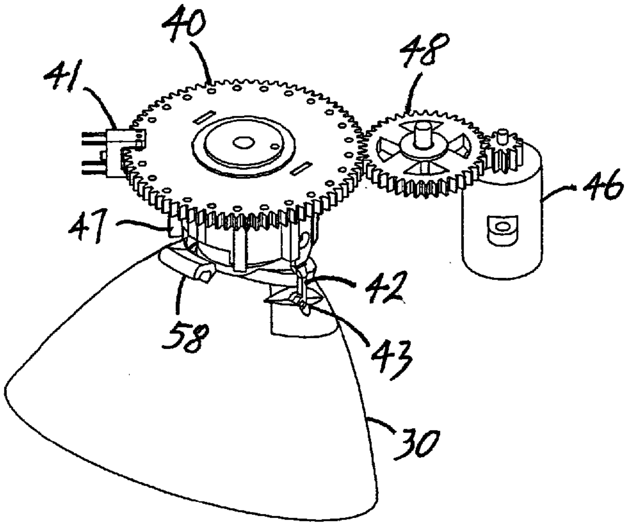
FIGS. 4 and 5 show the pan motion mechanism.
Figure 5:
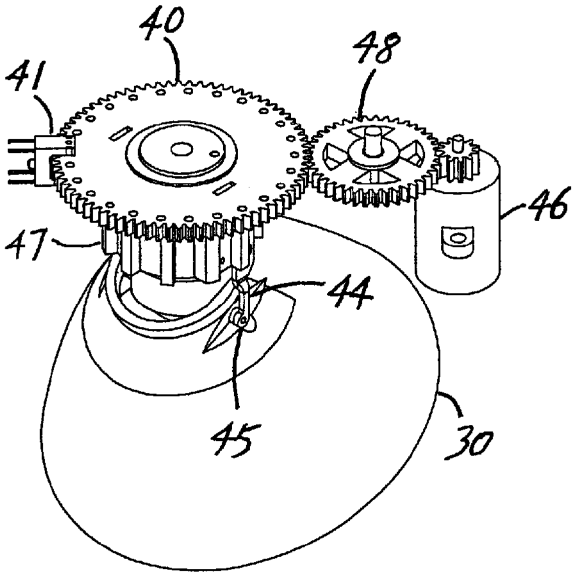

As shown in FIGS. 4 and 5, the first actuator may include a pan gear 40 mounted on a gear mount 47 and rotatable about the heatsink shaft 18. The pan gear 40 and the reflector 30 may be connected together by two arms 42, 44. A pan motor 46 is employed to rotate the gear 40, directly or via an intermediate link gear 48, which in turn rotate the reflector 30.

The pan motor 46 drives the pan gear 40 via the link gear 48. The link gear 48 can be employed for keeping the overall height of the whole moving mechanism low. The pan motor 46 can be mounted on the other side of the heatsink base so as to drive the pan gear 40 directly without using the link gear 48. Each of the actuating arms 42, 44 has one end forming a pivot joint 43, 45 with the reflector 30 while having the other end fixed on the pan gear 40. The reflector's pan rotation is capable of running in the same direction endlessly (i.e. multiple numbers of rotations) without stopping to scan and illuminate a large size spot or spot ring on a plane orthogonal to the central longitudinal axis X of the lighting device. The two actuating arms 42, 44 rotate with the pan gear 40 together about the heatsink shaft 18, which acts as a rotation shaft of the pan gear 40.

Figure 7:
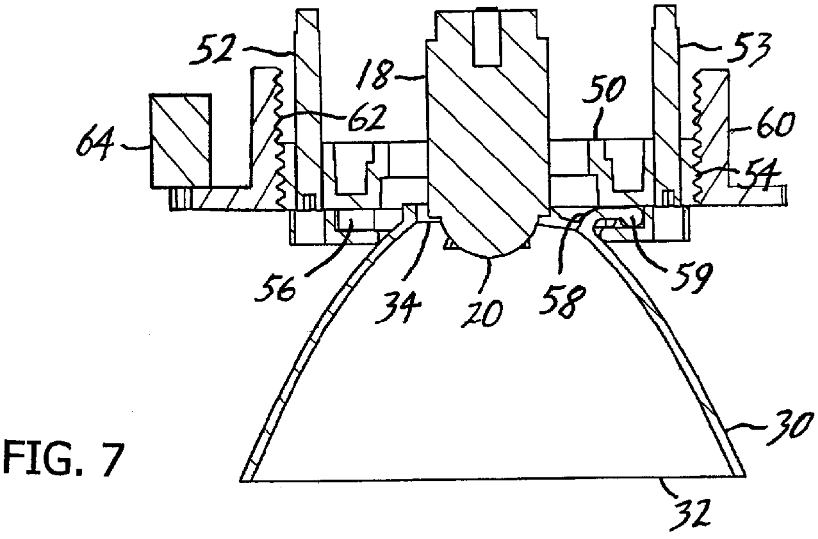
FIGS. 7-9 show the stylus head of the reflector slidable within an annular groove of the collar.
Figure 8:
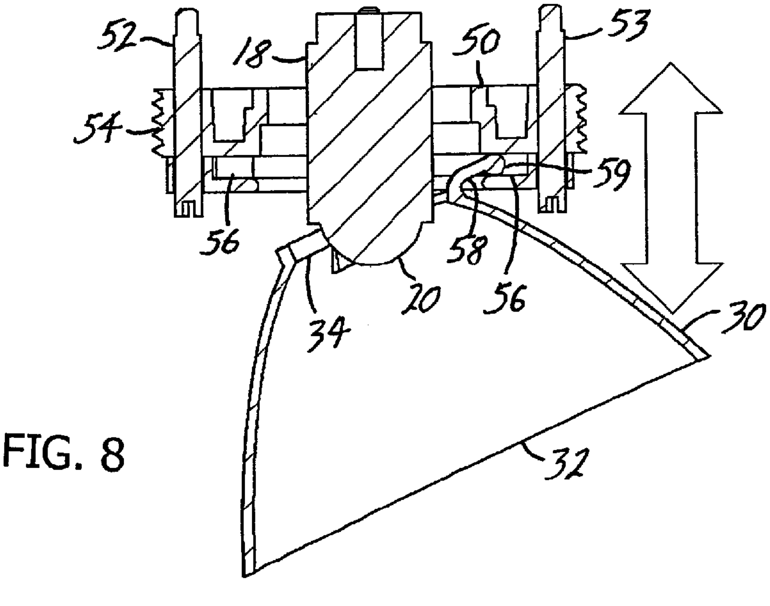
Figure 9:
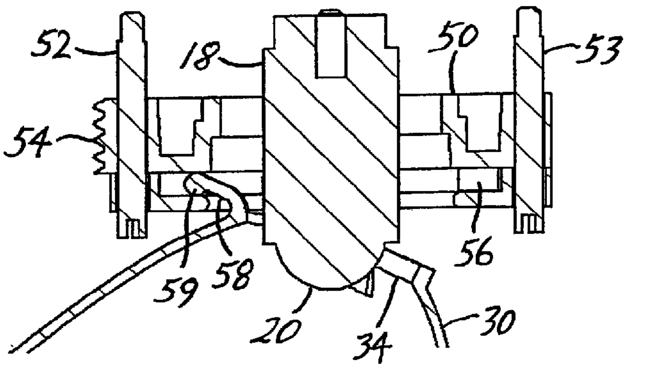
Figure 7B:
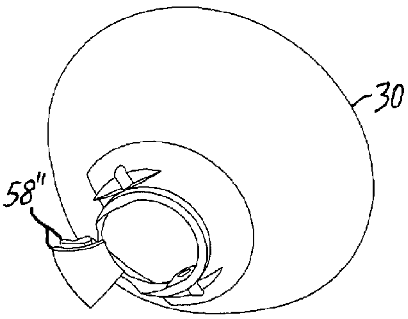
Figure 7A:
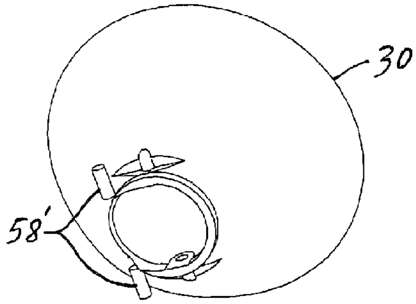
Figure 8B:
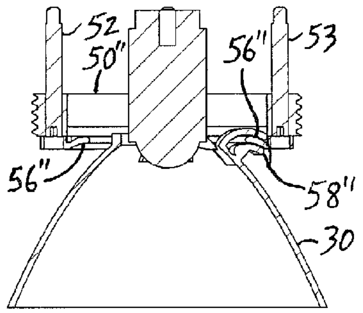
Figure 8A:
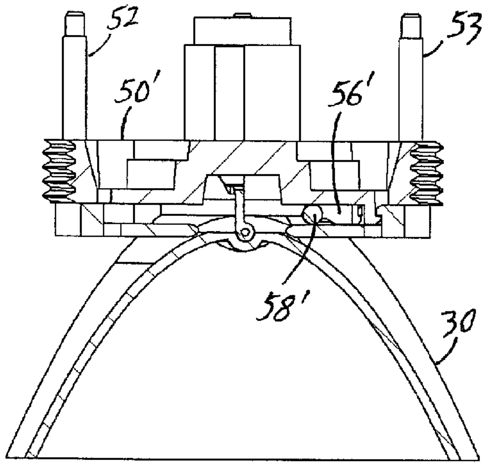
Figure 9B:
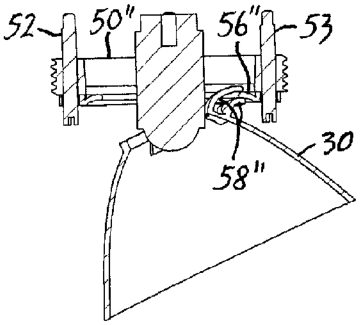
Figure 9A:
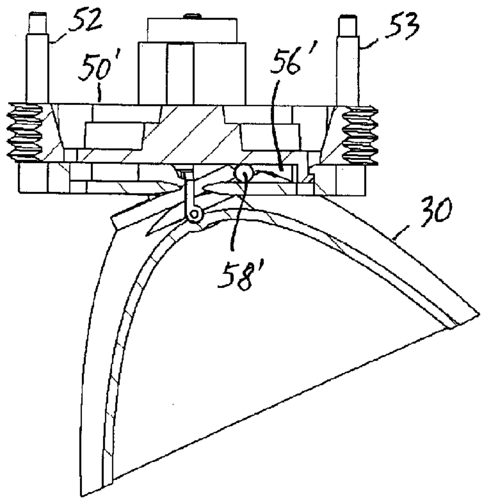

As shown in FIGS. 7-9, the second actuator may include a collar 50 mounted around the shaft 18 and movable along one or more columns 52, 53 parallel to the shaft 18. The collar 50 has external threads 54 and an inwardly facing and radially extending annular groove 56. A stylus 58 has a proximal end attached to the reflector 30 and a distal end, in the form of an enlarged head 59, disposed within the annular groove 56. A cup gear 60 has internal threads 62 meshed with the external threads 54 of the collar 30. A tilt motor 64 is employed to rotate the cup gear 60 about the axis X, drive the collar 50 to move up or down along the columns 52, 53 and move the distal end of the stylus 58 generally inwardly or outwardly and radially within the annular groove 56 thereby tilting the reflector 30.

Two other embodiments of the engagement of the reflector 30 with the collar 50 are illustrated in FIGS. 7(*a*)-9(*a*) and FIGS. 7(*b*)-9(*b*) respectively.

As shown in FIGS. 7(*a*)-9(*a*), the collar 50' may have an inwardly facing and radially extending annular groove 56'. A pair of coaxial pins 58' has proximal ends attached to the reflector 30 and distal ends slidably engaged within the annular groove 56'. The tilt motor 64 is employed to rotate the cup gear 60, drive the collar 50' to move up or down along the columns 52, 53, and move the distal ends of the pair of pins 58' generally inwardly or outwardly and radially within the annular groove 56' thereby tilting the reflector 30.

As shown in FIGS. 7(*b*)-9(*b*), the collar 50" may have an inwardly facing and radially extending annular ring 56". A pair of styli 58" has proximal ends attached to the reflector 30 and distal ends slidably engaged with the annular ring 56". The pair of styli 58" is longitudinally spaced apart defining a space in which the annular ring 56" slides. The tilt motor 64 is employed to rotate the cup gear 60, drive the collar 50" to move up or down along the columns 52, 53, and move the distal ends of the pair of pins 58' generally inwardly or outwardly and radially relative to the annular ring 56' thereby tilting the reflector 30.

Tilt angle can be changed by varying the position of the reflector stylus 58 which forms a hinge with the two pivot joints 43, 45 of the reflector 30. The tilt motor 64 drives the cup gear 60 which contains helical threads 62 on the internal wall. The collar 50 has a tendency of rotating with the cup gear 60. Due to the restriction effect of the columns 52, 53 the collar 50 can only translates inwards or outwards without rotation. Tilt motion components (i.e. cup gear 60, collar 50, tilt motor 64) are mounted onto the stationary housing 14, rather than mounted on a chassis moved during pan motion, as in most prior art. The collar 50 may be formed of two layers defining two contacting surfaces. The stylus head 59 can move between the two contacting surfaces. The tilt motion components do not load the pan motor 46 because of the stylus' sliding motion over the smooth surfaces of the double layer collar 50. In other words, the light reflecting component's tilt and pan motions are driven independently.

Figure 10:
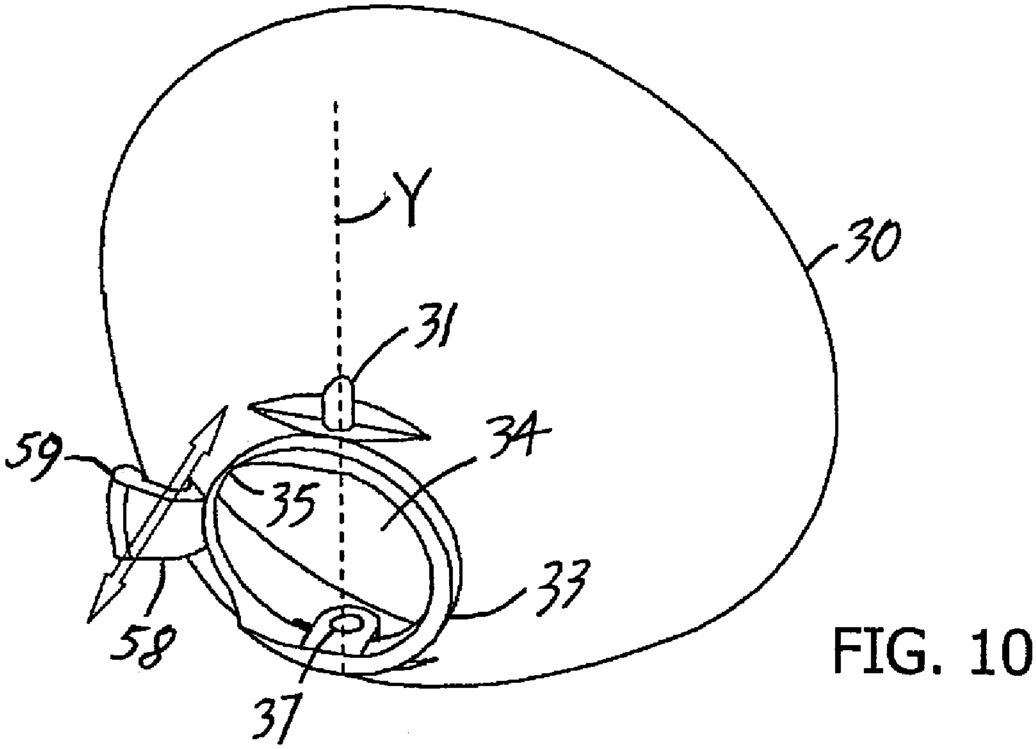
FIG. 10 illustrates the tilt motion of a short focal length reflector.
Figure 11:
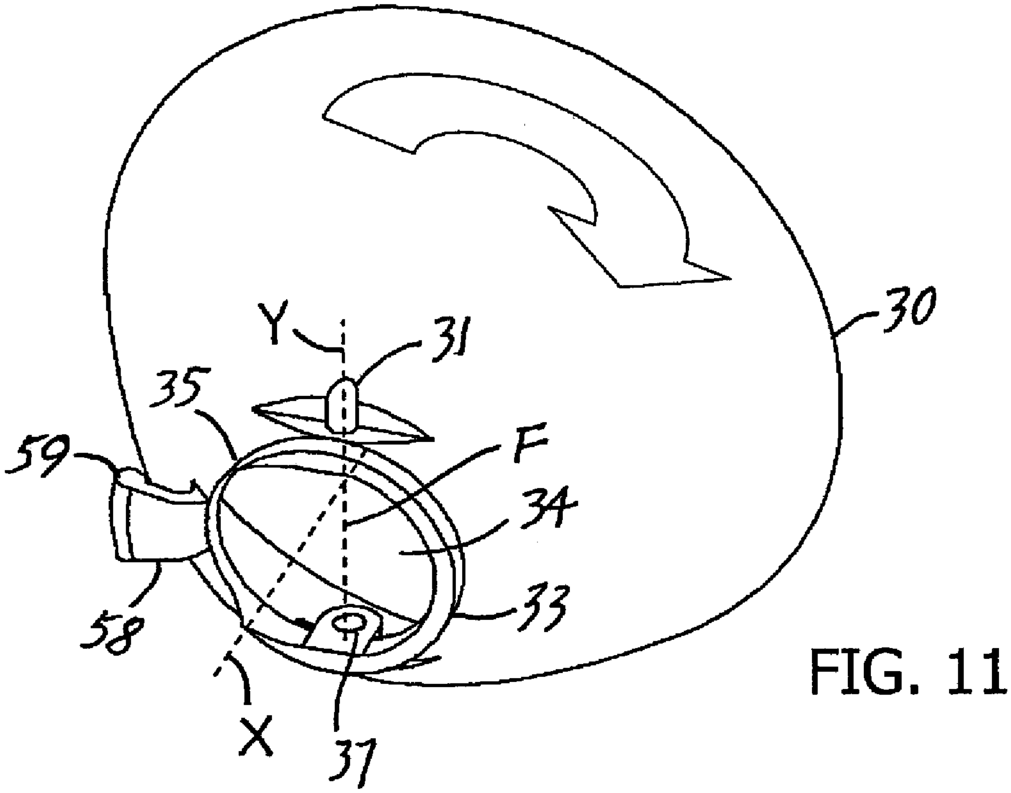
FIG. 11 illustrates the pan motion of a short focal length reflector.

As shown in FIGS. 10 and 11, the reflector 30 is pivotable about a pivot axis Y defined by two 180 degrees apart cylindrical holes 31, 37 located at its base, such that the focal point F remains at the same center position between the two pivot arms 42, 44 all the time. The stationary high power LED 20 is located at the base of the reflector 30 and remains at the reflector's focal point F during all reflector's tilt and pan motions. The reflector's asymmetrical elliptical rear opening 34 at its base allows tilting at a large angle about the stationary high power LED 20 with only small light loss, while maintaining a reliable thermal path from the LED 20 to the heatsink 16.

The parabolic or elliptical reflector 30 is a short focal length reflector capable of rotating generally coaxially about the stationary high power LED 20 with small space consumption to reflect the LED light to the desired direction. The reflector 30 with short focal length, including multi-facet designs, has a smaller diameter light output opening than another one of the same height but with longer focal length. In other words, a short focal length reflector consumes less space (including space consumed for its rotation) and is lighter in weight (smaller angular momentum), reducing the impact due to pendulum effect. It also helps to shorten the length of the heatsink shaft 18 and lower its thermal resistance.

FIGS. 12(*a*), 12(*b*), 12(*c*), 13(*a*), 13(*b*) and 13(*c*) show that short focal length reflectors consume less space, and require a heatsink shaft shorter in length that means lower thermal resistance. Given maximum tilt angle=60 degrees, the parabolic reflector in FIG. 12(*a*) having 50 mm length, 5 mm focal length and 63 mm diameter consumes a space of 551 cc; the parabolic reflector in FIG. 12(*b*) having 50 mm length, 10 mm focal length and 89 mm diameter consumes a space of 820 cc; and the parabolic reflector in FIG. 12(*c*) having 50 mm length, 20 mm focal length and 127 mm diameter consumes a space of 1,463 cc. Given maximum tilt angle=30 degrees, the parabolic reflector in FIG. 13(*a*) consumes a space of 490 cc; the parabolic reflector in FIG. 13(*b*) consumes a space of 767 cc; and the parabolic reflector in FIG. 13(*c*) consumes a space of 1,298 cc.

FIGS. 14 (*a*), 14(*b*), 14(*c*), 15(*a*), 15(*b*) and 15(*c*) and Table 1 show that a LED light source mounted on a heatsink shaft achieve lower loss as compared to a point light source mounted on a heatsink shaft whether there is no opening at all or having an opening of either shape. A reflector having asymmetrical elliptical opening gives lowest light loss as compared to reflectors having other types of openings. FIG. 14 (*a*) shows the reflector at Angle=0 with an asymmetrical elliptical rear opening; FIG. 14 (*b*) shows the reflector at Angle=0 with a symmetrical elliptical rear opening; FIG. 14 (*c*) shows the reflector at Angle=0 with a circular rear opening; FIG. 15 (*a*) shows the reflector at Angle=60 with an asymmetrical elliptical rear opening; FIG. 15 (*b*) shows the reflector at Angle=60 with a symmetrical elliptical rear opening; and FIG. 15 (*c*) shows the reflector at Angle=60 with a circular rear opening.

Conventional point light source gives a low optical efficiency because light radiation going to the heatsink direction is lost. If we move the point light source towards the centre of the reflector, then we can get higher optical efficiency. With a longer focal length, a parabolic or elliptical reflector having same height will have larger diameter. FIGS. 12 and 13 show that changing the focal length from 5 mm to 20 mm result in a 129 mm diameter reflector. In order to allow the reflector to rotate to maximum 60 degrees in opposite directions from normal, a 20 mm focal length reflector consumes 1,463 cc space while a 5 mm focal length reflector only consumes 551 cc space.

TABLE 1

| | Reflector tilt angle | | | | | | | | | |
|---|---|---|---|---|---|---|---|---|---|---|
| | 0 deg | 0 deg | 0 deg | 0 deg | 40 deg | 40 deg | 40 deg | 60 deg | 60 deg | 60 deg |
| Opening type | No opening | Asym | Sym | Cir. | Asym | Sym | Cir. | Asym | Sym | Cir. |
| Reflector output (LED source) | 390 | 389 | 388 | 383 | 333 | 325 | 305 | 290 | 278 | 252 |
| Light efficiency | 100% | 99% | 99% | 98% | 85% | 83% | 78% | 74% | 71% | 65% |
| Reflector output (Point light source) | 217 | 197 | 180 | 171 | 190 | 167 | 152 | 172 | 157 | 138 |
| Light efficiency | 56% | 51% | 46% | 44% | 49% | 43% | 39% | 44% | 40% | 35% |

Figure 16:
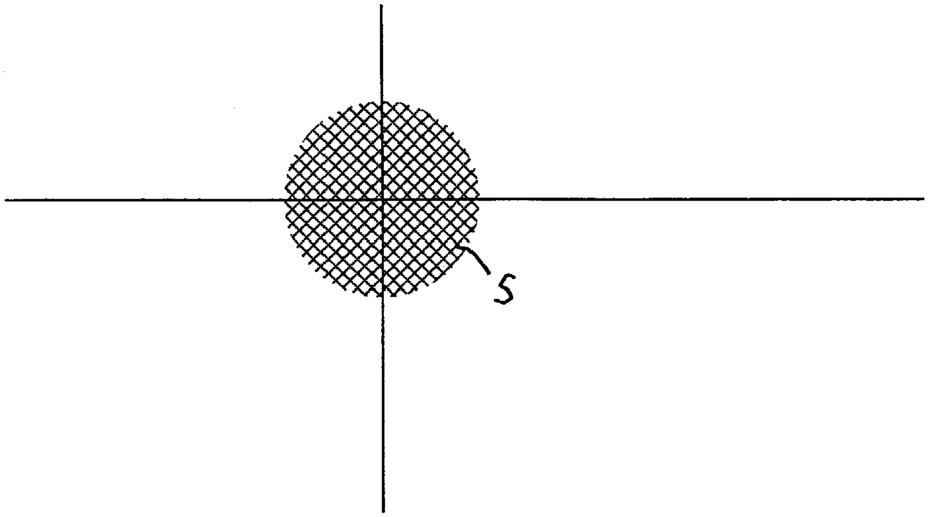
FIG. 16 shows how the LED light reflecting device illuminates a light spot on the floor.

FIG. 16 shows how the LED light reflecting device illuminates a light spot S on the floor.

Figure 17:
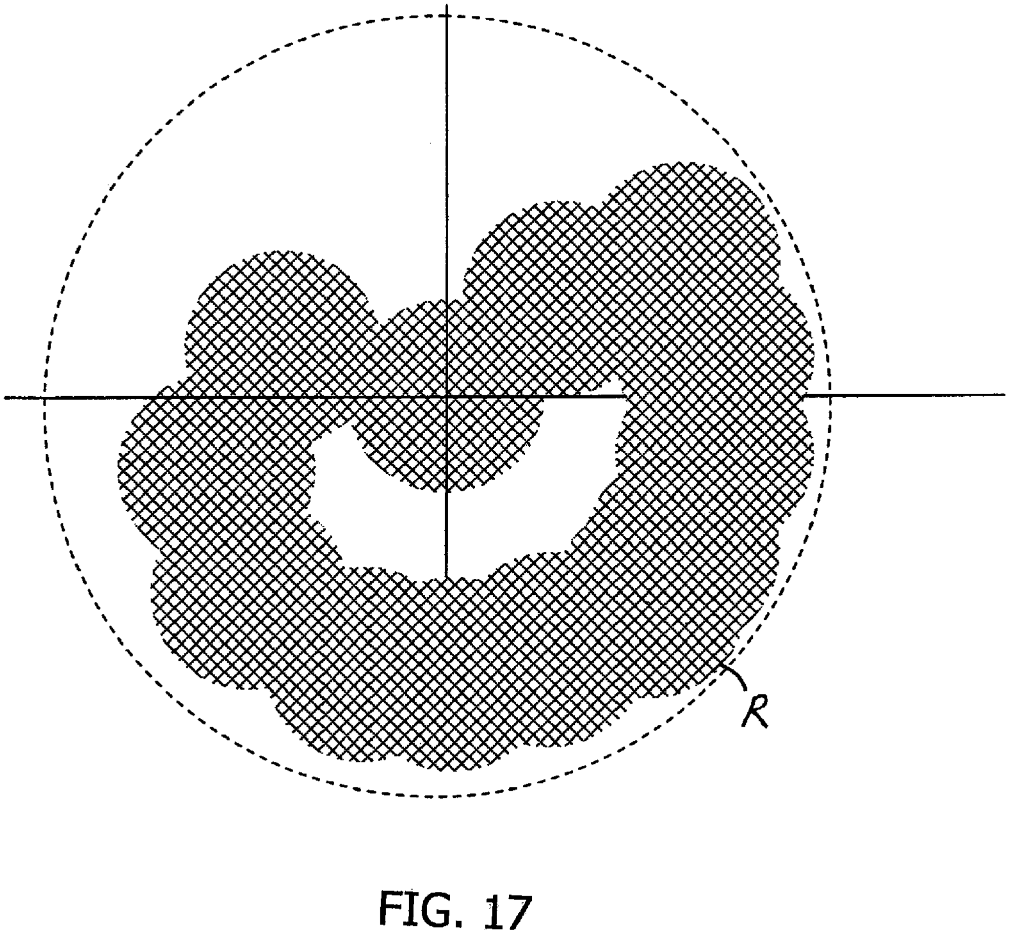
FIGS. 17 and 18 show how the LED light reflecting device generates a spot ring on the floor.
Figure 18:
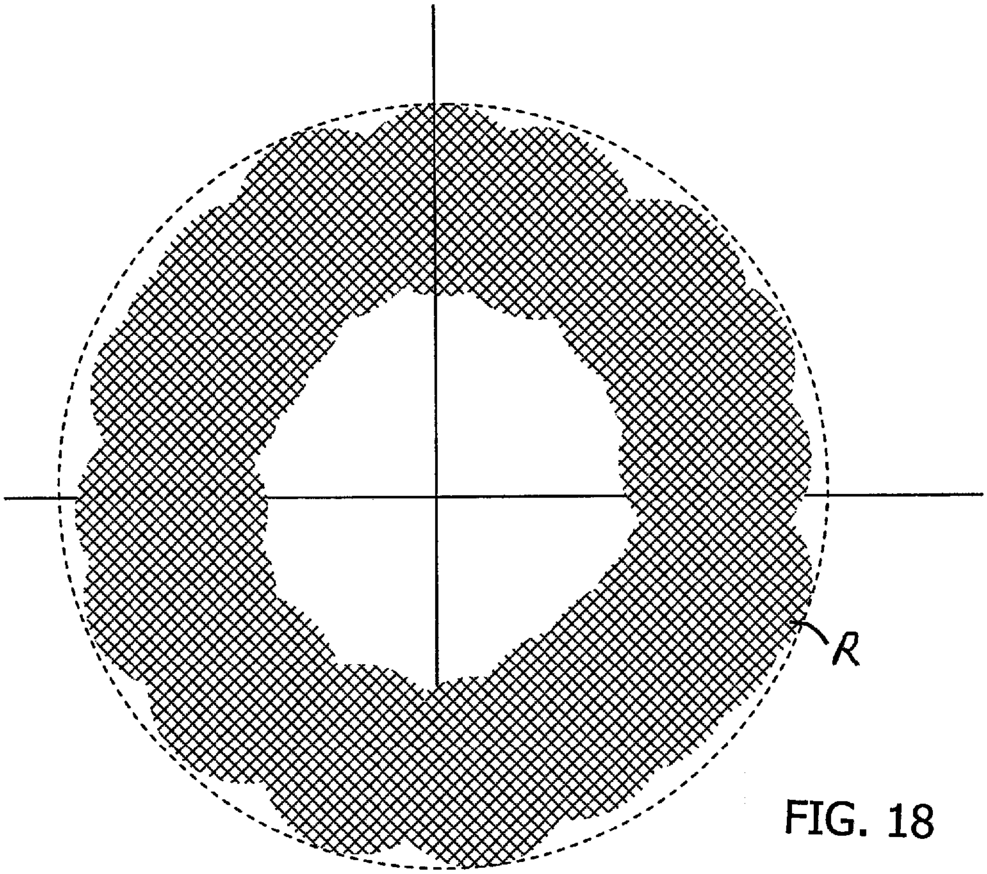

FIGS. 17 and 18 show how the LED light reflecting device generates a spot ring R on the floor.

Figure 19:
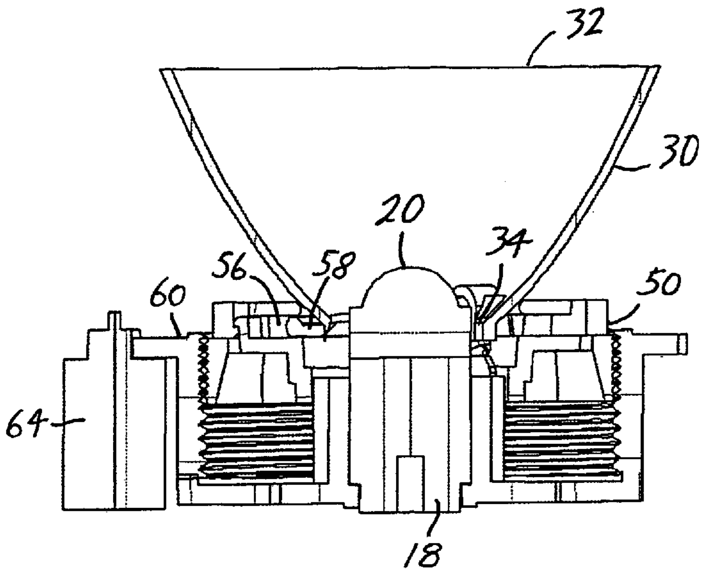
FIG. 19 shows a second embodiment of the light reflecting device with integrated cup and pan gears.
Figure 20:
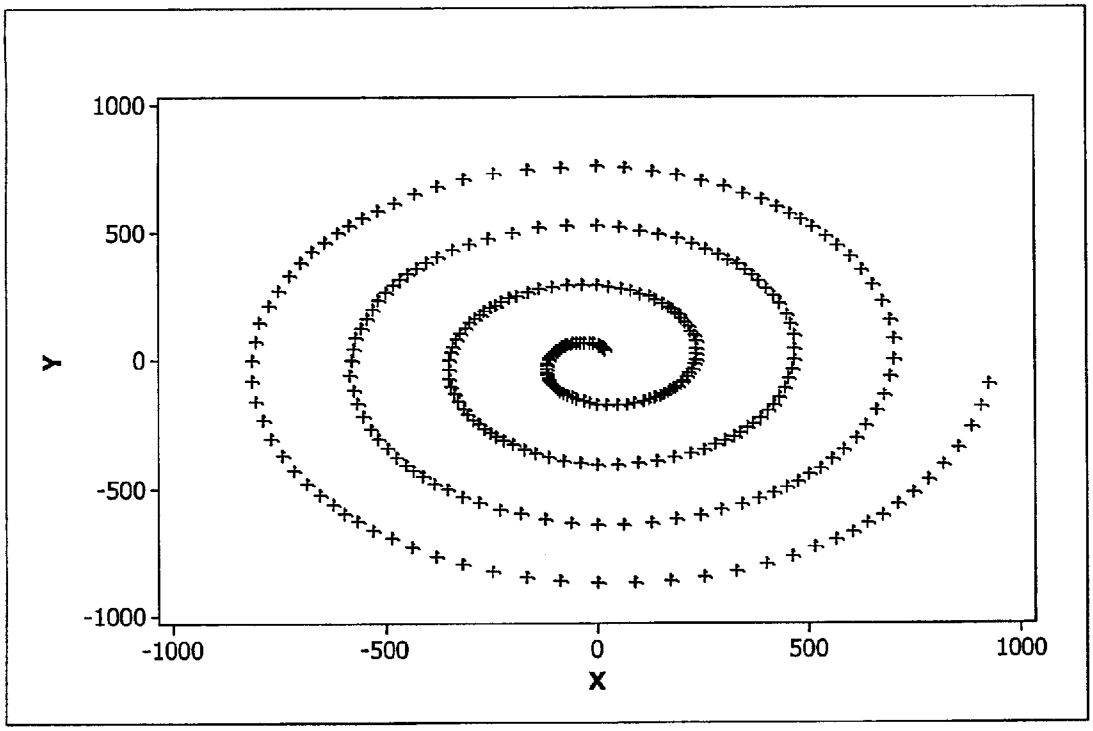
FIG. 20 shows a spiral path of light from the light reflecting device of FIG. 19.

FIG. 19 shows a second embodiment of the light reflecting device with integrated pan and cup gear 60. The mechanism of the second embodiment is the same as that of the first embodiment except that the cup gear for tilt motion is integrally formed with the pan gear for pan motion. Only one motor 64 is used to rotate the integrated pan and cup gear 60 thereby rotating and tilting the reflector 30 simultaneously along a spiral path, as illustrated in FIG. 20.

If a light source is mounted onto a heatsink shaft, an LED light source (generally all LEDs have Lambertian characteristics) achieves much lower loss as compared to conventional point light source. Such phenomenon is confirmed using a simulation exercise. Light sources of both types are mounted on 14 mm diameter copper rods. A 50 mm diameter parabolic reflector has an asymmetrical elliptical opening at the base to allow the tilt rotation of the reflector. Two less preferred designs are also shown for comparison: (1) symmetrical elliptical opening and (2) circular opening. Symmetrical elliptical opening allows the reflector to rotate in opposite tilt directions while circular opening allows tilting in all directions.

A point light source and a Seoul Semiconductor model P7 LED (11 Watts) having the same light flux output are used to simulate the reflected light output from various designs. The simulations were conducted using a ray tracing software called Tracepro. At zero degree tilt angle, the reflector outputs 390 lumens using an LED light source whereas it only gives 217 lumens if point light source of same light output is used. The reason for the difference is because about half of the point light source radiation goes to the back direction whereas all the LED light output goes to the front direction. Point light source also gives low output when the reflector is tilted.

Thermal interface material should be used to lower the thermal resistance between the heat conducting components such as the LED PCB and the heatsink shaft 18. A very reliable heat conduction path, as shown by the arrows in FIG. 2, can be guaranteed because there is no moving part between the LED heat source 20 and the heatsink 16.

The LED lamp 10 further includes a power supply and electronic control 22 coupled to the LED 20 and the first and second actuators, as depicted in FIG. 1. The power supply and electronic control 22 includes a power supply unit and an electronic control.

The power supply unit converts the high voltage AC power to low voltage DC power for use by the high power LED 20 and the control electronics. During the first use after installation, the control electronics recognize the pan zero position and tilt zero position by reading the inputs of sensor 41. Whenever the control electronics receive a new command to move the beam to a new direction, it outputs the appropriate power to the pan motor 46 and tilt motor 64 while reading the current angle data from the sensors.

Most stationary and non-stationary components are coaxially mounted (i.e. LED 20, cylindrical shaft 18, gear mount 47, pan gear 40, cylindrical cup gear 60, collar 50, heatsink 16, lamp base 12, housing 14, control and power electronics 22) or symmetrically mounted (i.e. motors 46, 64, housing 14, columns 52, 53) to achieve double benefit of space saving and light bulb's overall cylindrical symmetry. Cylindrical symmetry can reduce pendulum effect.

According to the requirements on optical effects of the heat dissipating light reflecting device, the short focal length reflector disclosed in the present patent application can be manufactured by a method including the steps of (A) selecting the LED light source; and (B) Designing the short focal length reflector. Details of the above steps will be described hereinbelow.

A. Selecting the LED Light Source

There are many design options in selecting the LED light source. Both a single high power LED and an array of LEDs can deliver an equal amount of light flux. For example, the body of a Seoul Semiconductor's P7 LED (10 watt class) is 12 mm in diameter with a thermal resistance of 3 degrees Celsius per watt; whereas Osram's Oslon series LED (1 watt class but can operate up to 3 watts) is only 3 mm by 3 mm in size with a thermal resistance of 7 degrees Celsius per watt. 9 pieces of Oslon LED occupies similar space as P7 but the temperature difference between an Oslon's LED junction and its solder terminal is only 7 degrees Celsius, where as the P7 temperature difference is 30 degrees. In other words, LED array design requires a smaller heatsink to maintain same LED junction temperature. The choice of LED will determine the size of the reflector asymmetrical opening.

B. Designing the Short Focal Length Reflector

Figure 6:
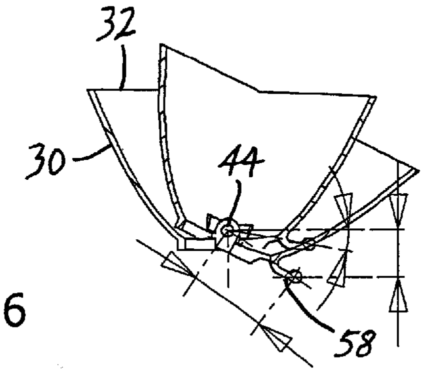
FIG. 6 shows the relationship between tilt angle and vertical displacement of the stylus.

The relationship of the focal length, diameter and height of the reflector generally follow a parabolic or elliptical function. Such relationship is also valid for multi-facet reflectors. The reflector's inside optical surface can be designed with a commercial software package in order to achieve the desired beam characteristics. As shown in FIGS. 12 and 13, the maximum tilt angle of the reflector will determine the space requirement of the reflector's motion. Since the total available space of a light bulb is limited, the maximum tilt angle is normally decided with consideration on the space requirements of its heatsink, motion components, control and power electronics. FIG. 6 shows the relationship between tilt angle and vertical displacement of the stylus;

The tilt angle of the reflector is given by the following relationship:

Tilt angle=arcsine(vertical displacement/distance between stylus head center and the pivot axis)−offset, where as Offset=arcsine(vertical distance between the pivot axis and the stylus head center/distance between stylus head center and the pivot axis)

Thus the maximum vertical displacement is given by:

Maximum vertical displacement=sine(maximum tilt angle+offset)* distance between stylus head center and the pivot axis While the heat dissipating light reflecting device disclosed in the present application has been shown and described with particular references to a number of preferred embodiments thereof, it should be noted that various other changes or modifications may be made without departing from the scope of the appending claims.

What is claimed is:

1. A LED lamp with adjustable beam direction, the lamp comprising: (a) a housing; (b) a lamp base attached to one end of the housing for insertion into a lamp socket; (c) a heatsink shaft mounted within the housing which serves as a heatsink; (d) a LED attached to one end of the heatsink shaft; (e) a reflector comprising a light output front opening and an asymmetric elliptical shaped rear opening, the LED being disposed proximate to the rear opening; (f) a first actuator for rotating the reflector about the LED; and (g) a second actuator for tilting the reflector about the LED;

wherein the first actuator comprises: a gear rotatable about the heatsink shaft; two arms comprising two ends fixedly connected to the gear and two opposite ends pivotably connected to a rear surface of the reflector by two pivot joints respectively; and a pan motor for rotating the gear and in turn rotating the reflector about a central longitudinal axis of the heatsink shaft; and wherein the second actuator comprises: a collar mounted around the heatsink shaft and movable along two columns connected to the housing and oriented generally parallel to the heatsink shaft, the collar comprising external threads and an inwardly and radially extending annular member; a collar-engaging member comprising a proximal end attached to the reflector and a distal end slidably engaged with the annular member; a cup gear comprising internal threads meshed with the external threads of the collar; and a tilt motor for rotating the cup gear, thereby driving the collar along the two columns, moving the distal end of the collar-engaging member radially relative to the annular member, and tilting the reflector about a pivot axis defined by the two pivot joints.

2. A LED light reflecting device comprising: (a) a housing; (b) a LED attached to the housing; (c) a reflector comprising a light output front opening and a rear opening, the reflector being rotatably and tiltably coupled to the housing with the LED disposed proximate to the rear opening; (d) a first actuator for rotating the reflector about the LED; (e) a second actuator for tilting the reflector about the LED; and (f) a heatsink shaft mounted within the housing, and at least part of the housing serving as a heatsink;

wherein the first actuator comprises: a gear rotatable about the heatsink shaft; two arms comprising two ends fixedly connected to the gear and two opposite ends pivotably connected to a rear surface of the reflector by two pivot joints; and a pan motor for rotating the gear and in turn rotating the reflector about a central longitudinal axis of the heatsink shaft; and wherein the second actuator comprises: a collar mounted around the heatsink shaft and movable along at least one column connected to the housing and oriented generally parallel to the heatsink shaft, the collar comprising external threads and an inwardly and radially extending annular member; a collar-engaging member comprising a proximal end attached to the reflector and a distal end slidably engaged with the annular member; a cup gear comprising internal threads meshed with the external threads of the collar; and a tilt motor for rotating the cup gear, thereby driving the collar along the at least one column, and moving the distal end of the collar-engaging member radially relative to the annular member, and tilting the reflector about a pivot axis defined by the two pivot joints.

3. The LED light reflecting device as claimed in claim 2, wherein the rear opening is asymmetric shaped.

4. The LED light reflecting device as claimed in claim 2, wherein the rear opening is defined by a parabolic half and a semi-circle half.

5. The LED light reflecting device as claimed in claim 2, wherein the reflector comprises a parabolic reflector or an elliptical reflector or a multi-facet reflector.

6. The LED light reflecting device as claimed in claim 2, further comprising a plurality of sensors for sensing the pan and tilt motions of the reflector.

7. The LED light reflecting device as claimed in claim 2, wherein the two arms are spaced 180 degrees apart on the reflector.

8. The LED light reflecting device as claimed in claim 2, further comprising a link gear coupling between the motor and the gear rotating about the heatsink shaft.

9. The LED light reflecting device as claimed in claim 2, wherein the collar is mounted around the heatsink shaft and movable along two columns connected to the housing.

10. The LED light reflecting device as claimed in claim 2, wherein the annular member is an inwardly facing and radially extending annular groove.

11. The LED light reflecting device as claimed in claim 10, wherein the collar-engaging member comprises a stylus, and the stylus comprises an enlarged head movable within the annular groove.

12. The LED light reflecting device as claimed in claim 10, wherein the collar-engaging member comprises a pair of coaxial pins.

13. The LED light reflecting device as claimed in claim 2, wherein the annular member comprises an inwardly facing and radially extending annular ring.

14. The LED light reflecting device as claimed in claim 13, wherein the collar-engaging member comprises a pair of styli, the pair of styli being longitudinally spaced part and defining a space in which the annular ring slides.

15. A LED light reflecting device comprising: (a) a housing; (b) a LED attached to the housing; (c) a reflector comprising a light output front opening and a rear opening, the reflector being rotatably and tiltably coupled to the housing with the LED disposed proximate to the rear opening; (d) a first actuator for rotating the reflector about the LED; (e) a second actuator for tilting the reflector about the LED; and (f) a heatsink shaft mounted within the housing, and at least part of the housing serving as a heatsink; wherein the first and second actuators comprise: a collar mounted around the heatsink shaft, the collar comprising external threads and an inwardly and radially extending annular member; a collar-engaging member comprising a proximal end attached to the reflector and a distal end slidably engaged with the annular member; a cup gear comprising internal threads meshed with the external threads of the collar;

and a motor for rotating the cup gear thereby driving the collar along the heatsink shaft, moving the distal ends of the collar-engaging member radially relative to the annular member, and rotating and tilting the reflector simultaneously along a spiral path.

16. The LED light reflecting device as claimed in claim 15, wherein the annular member is an inwardly facing and radially extending annular groove.

17. The LED light reflecting device as claimed in claim 16, wherein the collar-engaging member comprises a stylus, and the stylus comprises an enlarged head movable within the annular groove.

18. The LED light reflecting device as claimed in claim 16, wherein the collar-engaging member comprises a pair of coaxial pins.

19. The LED light reflecting device as claimed in claim 15, wherein the annular member is an inwardly facing and radially extending annular ring.

20. The LED light reflecting device as claimed in claim 19, wherein the collar-engaging member comprises a pair of styli, the pair of styli being longitudinally spaced part and defining a space in which the annular ring slides.

* * * * *